United States Patent Office 2,757,167
Patented July 31, 1956

2,757,167

PREPARATION OF FLUORINATED POLYMERS WITH OXYGEN DIFLUORIDE CATALYST

Newell C. Cook, Schenectady, N. Y., assignor to General Electric Company, a corporation of New York No Drawing. Application May 12, 1954,
Serial No. 429,371

4 Claims. (Cl. 260—92.1)

This invention is concerned with a process for making fluorinated polymers. More particularly, the invention relates to a process for making fluorinated polymers which comprises effecting reaction between a mixture of ingredients comprising a fluorinated unsaturated monomer and a polymerizing agent therefor comprising oxygen difluoride ($OF_2$).

Certain unsaturated polymerizable fluorinated olefins such as chlorotrifluoroethylene, hexafluorobutadiene, etc. have been found difficult to polymerize. In order to effect polymerization of such materials to high molecular weights, it is often necessary to employ fairly stringent conditions as, for instance, strong catalysts, long periods of time, high pressures, etc.

Unexpectedly, I have discovered that a certain polymerizing agent, specifically adaptable for polymerizing fluorinated olefins, is capable of effecting such polymerization rapidly and easily at room temperatures or below to yield products which can be obtained in either the solid or liquid form. This polymerizing agent which has been found so eminently suitable for the purpose comprises oxygen difluoride (boiling point $-146°$ C.) which may be prepared in accordance with the process described by Lebean and Damiens, Compt. Rend., 185, 652 (1927).

In accordance with my invention, I effect polymerization of fluorinated olefinic materials in the presence of the above-described difluoride. Among the polymerizable olefins which have been found readily polymerized by oxygen difluoride are for example, tetrafluoroethylene, chlorotrifluoroethylene, hexafluorobutadiene, vinylidene chloride, styrene, vinyl chloride, acrylonitrile, etc.

The conditions for polymerization are relatively simple. In one method, it is merely only necessary to introduce the reactants, such as the fluorinated olefin and small amounts of the oxygen difluoride (e. g., from 0.0001 to 2 per cent, by weight, based on the weight of the monomer) into a pressure vessel preferably equipped with stirring means, closing the pressure vessel, and allowing the reaction to proceed while the reaction mixture is being agitated at temperatures of the order of from about room temperature to as low as $-100°$ C. Another method comprises bubbling the $OF_2$ through the polymerizable monomer maintained in liquid form at around atmospheric pressure. In some instances, such as in the polymerization of tetrafluoroethylene, the $OF_2$ is advantageously diluted with an inert gas such as helium and nitrogen to maintain better control of the reaction, employing weight ratios of $OF_2$ to inert gases of from 1 to 1 to 0.001 to 1.

Temperatures in excess of room temperature (above $25°$ C.) may be employed, but are usually not necessary, unless it is desired to permit the reaction temperature to rise above room temperature as the reaction proceeds, such as in the above-described bubbling reaction. It is desirable for optimum conversion to high molecular weight products that lower temperatures, substantially below room temperature be employed. The time of reaction will be varied depending upon such conditions as the concentration of the catalyst, the particular fluorinated olefin employed, the temperature of the reaction, the state of polymerization desired, etc. Generally, I have found that times of the order of about ½ hour to about 4 to 6 hours are sufficient to obtain the optimum degree of reaction between the fluorinated olefin and the oxygen difluoride. When bubbling the $OF_2$ through the monomer, particularly in the case of tetrafluoroethylene, times of only a few minutes are usually required to effect the desired polymerization.

After the reaction has been completed, all materials volatile at room temperature are removed, and the reaction product subjected to further fractional distillation either in the presence of heat or vacuum to remove low boiling materials, to obtain a homogeneous product, either in the highly viscous liquid state or in the higher molecular weight solid state.

In order that those skilled in the art may better understand how the present invention may be practiced, the following examples are given by way of illustration and not by way of limitation. All parts are by weight.

Example 1

About 10 grams of tetrafluoroethylene suitably cooled to the liquid state was placed in a reaction vessel, and $OF_2$ (diluted with helium in a weight ratio of 1 part $OF_2$ to 50 parts helium) was bubbled through the liquid tetrafluoroethylene (maintained in this state throughout essentially the entire reaction) for about 5 minutes at a rate of about 5 cc. oxygen difluoride per minute. The reaction was maintained at a temperature of about $-80°$ C. Upon the first addition of $OF_2$, finely divided solid polymer began to settle out, and in a short time the entire liquid monomer was converted to a high molecular weight, solid, waxy product similar to that obtained by polymerizing tetrafluoroethylene by prior known means, and sold under the name of Teflon. A sheet pressed at elevated temperature from this finely divided powder was tough and coherent.

Example 2

In this example, pure undiluted oxygen difluoride was bubbled through liquid chlorotrifluoroethylene similarly as was done in Example 1 but employing instead a reaction temperature (of the monomer) of about $-30°$ C. This bubbling of the $OF_2$ was carried out for about 15 to 18 hours at the same rate of addition of $OF_2$ as in Example 1. The increased time of reaction was required to give a polymer which was of a sufficiently high molecular weight. This polymer which was a viscous oil boiling above $300°$ C. was found to have an average chain length of 16 —$CF_2$—$CFCl$— units. Solid polymeric chlorotrifluoroethylene was obtained by sealing in a glass reaction vessel the monomer and $OF_2$ in a weight ratio of about 1 to 0.002 parts, and allowing the mixture of ingredients to react with agitation under autogenous pressure at about $30°$–$50°$ C. for about 15 hours.

Example 3

$OF_2$ diluted with an equal volume of helium was bubbled through 18 cc. hexafluorobutadiene maintained at a temperature of about $-5°$ C. for about 10 hours at a rate of about 3–5 cc. $OF_2$ per minute. At the end of this time, the lower boiling materials were removed, and the residue fractionally distilled to yield about 8 cc. of an oil having a boiling point range up to $300°$ C., and 8 cc. of a viscous, non-volatile, high molecular weight oil having a boiling point above $300°$ C. and having an average molecular weight of about 1700.

It will be apparent to persons skilled in the art that other conditions of reaction and proportions of ingredients as well as other polymerizable monomers may be employed in place of those described in the foregoing examples without departing from the scope of the invention.

The solid polymeric materials obtained in accordance with the practice of the present invention, such as polytetrafluoroethylene and polychlorotrifluoroethylene, are useful for gasketing purposes where high heat resistance and chemical resistance are desired. In addition, these solid polymers can be used for insulation purposes either by extrusion over electrical conductors or by the wrapping of tapes prepared from the aforesaid polymers, around electrical conductors. The liquid low molecular weight polymers of the described compositions can also be used as lubricants.

What I claim as new and desire to secure by Letters Patent of the United States is:

1. The process for preparing a fluorinated polymer which comprises contacting at a temperature of from —100° C. to 50° C. a fluorinated monomer selected from the class consisting of tetrafluoroethylene, chlorotrifluoroethylene and hexafluorobutadiene with a polymerizing agent comprising oxygen difluoride, and thereafter isolating the polymer formed as a result of the above-described reaction.

2. The process for polymerizing tetrafluoroethylene to a solid polymer which comprises contacting at a temperature of from —100° C. to 50° C. the tetrafluoroethylene with oxygen difluoride diluted with an inert gas, and thereafter isolating the polymer formed as a result of the above-described reaction.

3. The process for polymerizing chlorotrifluoroethylene to a solid polymer which comprises contacting at a temperature of —100° C. to 50° C. the chlorotrifluoroethylene with small amounts of oxygen difluoride under superatmospheric pressure, and thereafter isolating the polymeric chlorotrifluoroethylene.

4. The process for polymerizing hexafluorobutadiene to a high molecular weight polymer which comprises contacting at a temperature of —100° C. to 50° C. hexafluorobutadiene with oxygen difluoride, and thereafter removing the low boiling, volatile materials to isolate the high molecular weight polymer.

No references cited.